United States Patent
McBride et al.

(10) Patent No.: US 7,001,163 B2
(45) Date of Patent: Feb. 21, 2006

(54) MOLD AND METHOD OF MOLDING ANNULAR TREAD

(75) Inventors: Michael Liam McBride, Akron, OH (US); Michael James Hogan, Tallmadge, OH (US); Michael James Buckley, Kent, OH (US); William Frederick Niessen, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 295 days.

(21) Appl. No.: 10/365,375

(22) Filed: Feb. 11, 2003

(65) Prior Publication Data

US 2004/0156936 A1    Aug. 12, 2004

(51) Int. Cl.
B29C 35/02    (2006.01)
(52) U.S. Cl. .................. 425/28.1; 425/46; 425/394
(58) Field of Classification Search ............ 425/28.1, 425/46, 394
See application file for complete search history.

(56) References Cited

U.S. PATENT DOCUMENTS

| | | | |
|---|---|---|---|
| 2,381,395 A | 8/1945 | Brown | |
| 3,358,330 A * | 12/1967 | Pacciarini et al. | 425/39 |
| 3,791,897 A | 2/1974 | Mesly | 156/137 |
| 3,934,968 A | 1/1976 | Cicognani | 425/28 B |
| 4,003,686 A * | 1/1977 | McLeod et al. | 425/373 |
| 4,207,052 A | 6/1980 | Satzler | 425/394 |
| 4,510,113 A | 4/1985 | Takano et al. | 264/257 |
| 5,066,448 A * | 11/1991 | Chlebina et al. | 264/326 |
| 6,086,811 A | 7/2000 | Fike | 264/271.1 |

FOREIGN PATENT DOCUMENTS

| | | |
|---|---|---|
| EP | 0 419 424 A2 | 3/1991 |
| EP | 1260351 | 11/2002 |
| EP | 1295702 | 3/2003 |

* cited by examiner

Primary Examiner—James P. Mackey
(74) Attorney, Agent, or Firm—June E. Rickey; David L. King

(57) ABSTRACT

An annular mold for curing an annular ring tread is disclosed. The annular mold has a plurality of radially movable and outwardly expandable inner segments for forming the inner surface of the tread and a plurality of radially movable and inwardly contracting outer segments for forming the tread outer surface. The radially outer segments are parallelograms. Each outer segment when in a closed molding position spans across one full radially inner segment and portions of two adjacent inner segments. The radially outer segments have inclined laterally extending edges relative to the axial direction of the mold while the circumferentially extending axially outer edges are perpendicular to the axial direction of the mold. The inclined laterally extending edges are inclined at least 5°, preferably about 10° relative to the axial direction. In the preferred embodiment the mold has 12 outer segments, each segment being of an arc length of about 30°.

9 Claims, 9 Drawing Sheets

MOLD AND METHOD OF MOLDING ANNULAR TREAD

TECHNICAL FIELD

The present invention relates to a mold for curing annular or ring treads, more preferably an annular tread belt assembly and further includes a unique method for molding said annular assemblies.

BACKGROUND OF THE INVENTION

In the making and curing of tire treads or tire tread and belt assemblies, it has been a common practice to wrap one or more layers of an uncured elastomer such as rubber, with or without reinforcements, such as metal cord reinforced plies or fabric and the like about a cylindrical core. The cylindrical core was selected to have a diameter equal to the desired inside diameter, the cylindrical core, with the elastomeric layers attached is generally placed in the center of a cylindrical core of a larger segmented cylinder, which larger segmented cylinder can include mold faces with desired tread patterns on the interior surface thereof, the diameter of the larger segmented cylinder is reduced until it properly contacts the material wrapped about the inner core apparatus and the entire apparatus is heated. The outer mold face segmented cylinder can, of course, be constantly heated but it is more difficult to heat the inner core about which the rubber is wrapped. As a result, premature curing might then take place. In U.S. Pat. No. 4,207,052 it was disclosed that this type of uneven curing of the elastomer deforms the cured tire tread or track belt assembly, in particular the metal cords within the tread belt can be displaced in such prior art molds due to the large temperature gradient between the inner core and the tread forming outer core. Accordingly, U.S. Pat. No. 4,207,052 showed a plurality of inner segments which fit together to form a generally cylindrical mold face surface to form the inner surface of the tread belt along with a means for retracting said plurality of inner segments toward the axis of said inner cylinder and a means for heating said segments. Additionally, the apparatus included a plurality of outer segments which fit together to form an inner generally cylindrical mold face surface of an outer cylinder, said outer cylinder being coaxial with said inner cylinder and of equal lengths therewith along with the means for retracting the plurality of outer segments away from the common axis of said cylinders and a means for heating said plurality of outer segments. The apparatus further included a pair of rings for sealing said inner cylinder to said outer cylinder at the ends thereof, at least one of said sealing rings being removable so that an uncured tire tread or track belt could be positionable between said plurality of inner segments and said plurality of outer segments wherein said plurality of inner segments was retracted toward said common axis and said plurality of outer segments is retracted away from said common axis.

The advantage of the above-referenced prior art mold for producing a tire tread or track belt assembly was that a uniformity of heat and pressure could be achieved upon the molded assembly.

In the prior art it was common for the radially retractable segments to have curved or arcuate shapes with vertically extending edges or sides. The outer segments could move inwardly and create an annular ring for forming the outer tread surface including the tread lugs. The inner segments would move sequentially radially outwardly in an alternating pattern wherein every other inner tread segment would be extended and then every other retracted inner tread segment could be then extended outwardly thereby forming a ring in the fully extended position thereby providing a mold that would cure the tread belt assembly over a period of time. This time was considered the mold cure cycle. Each radially outer segment and each radially inner segment had edges that were generally vertically extending and parallel to the common axis of both the inner and outer segments. Upon curing the tread the inner segments would then be retracted such that the inner surface of the molded tread could be separated from the first radially inward moving segments while the adjacent inner segments held in the closed position would retrain the tread belt assembly within the tread forming outer segments. Once the first radially inner segments had been moved inwardly, the second set of radially inner segments could be moved inwardly thereby releasing the entire inner surface of the tread. Thereafter the outer tread forming segments could be moved radially outwardly thereby releasing the tread belt assembly from the mold in its entirety. As the tread is removed from the outer segments a device would be used to lift the cured tread belt assembly from the mold.

In this type of prior art tread belt assembly molding the radially inner tread forming surface had equal sized tread segments generally with vertical extending edges that extended generally parallel to the axis of the mold rings when in the closed position. Similarly, the outer segments also had vertically extending or generally parallel side faces such that when the mold closed these faces would abut forming a tight joint between the segments. In principle the above-referenced prior art mold as described in U.S. Pat. No. 4,207,052 works generally well for fairly large tread belt assemblies. However, the application of the forces when one closes the inner segments and outer segments of such a mold is such that all movement works in a radial direction increasing the amount of pressure on the radially inward segments substantially.

It has been an objective of the present invention to provide a tread belt mold that would provide improved stability of both the inner and outer segments as the tread belt assemblies being cured such that a uniformity of curing pressure can be insured around the entire 360° circumference.

A second objective of the present invention is to provide a way in which the radially outer mold segments can be provided with improved structural integrity wherein the parting line between circumferentially adjacent segments extends across the tread lug forming depressions within the outer segments thereby avoiding thin ribs within the groove forming section of the mold to as large an extent as possible.

SUMMARY OF THE INVENTION

An annular mold for curing an annular ring tread is disclosed. The annular mold has a plurality of radially movable and outwardly expandable inner segments for forming the inner surface of the tread and a plurality of radially movable and inwardly contracting outer segments for forming the tread outer surface. The radially outer segments are parallelograms. Each outer segment when in a closed molding position spans across one full radially inner segment and portions of two adjacent inner segments.

The radially outer segments have inclined laterally extending edges relative to the axial direction of the mold while the circumferentially extending axially outer edges are perpendicular to the axial direction of the mold. The inclined laterally extending edges are inclined at least 5°, preferably about 10° relative to the axial direction. In the preferred embodiment the mold has 12 outer segments, each segment being of an arc length of about 30°.

The radially outer segments each have a pair of obtuse angles α and a pair of acute angles β. The sum of α and β equal 180°, the sum of the pairs of α and β equal 360°.

The mold when placed in a closed position has an annular shape, the outer segments forming an annular ring radially outward of the ring formed by the radially inner segments. The annular mold has an axis and a midcircumferential center plane perpendicular to the axis. The mold has a plurality of radially movable outer segments each movable outer segment being an arcuate parallelogram having pairs of obtuse included angles α and acute included angles β relative to the axis of the mold. The outer segments when closed form an annular ring of arcuately adjacent parallelograms. Preferably each axially outer segment has two inclined axially extending edges or surfaces. The inclined axially extending edges or surfaces are inclined relative to the axial direction. Furthermore, the arcuate circumferentially extending axially outer edges of the tread forming outer segments are preferably perpendicular to the axis of the mold. The combination of inner segments and outer segments provide a structurally improved mold design such that the arcuately shaped axially extending inclined outer edge surfaces extend beyond the radially inner segments such that the axially outer segments press against and have an inward force extending across one full axially inner segment and portions of two axially outer segments.

Preferably, the axially inclined edge surfaces of the outer segments extend across tread element forming depressions in each of the outer segments wherein the outer segments form circumferentially offset tread elements with respect to the mid-circumferential center plane of the mold and the linearly axially inclined surfaces extend nonparallel to the axis of the mold across circumferentially offset tread forming depressions within the outer segment. The tread element forming depressions can be elongated tread bars extending axially inwardly from the lateral edges of the mold toward the tread centerline. Furthermore, the tread element forming depression can include a circumferentially centered continuous rib forming depression. When the inclined edge surfaces extend across these tread element and rib forming depressions this insures that the parting line between the axially adjacent outer segments lie in a radially outer surface of the tread elements and do not lie within the groove forming ribs of the outer tread forming segment. This insures that the parting lines do not create weak thin projecting rib portions as is commonly found in single pitched off-the-road tires.

DEFINITIONS

"Circumferential" means lines or directions extending along the perimeter of the surface of the annular tread perpendicular to the axial direction.

"Cord" means one of the reinforcement strands of which the plies in the track are comprised.

"Equatorial plane (EP)" means the plane perpendicular to the track's axis of rotation and passing through the center of its tread.

"Footprint" means the contact patch or area of contact of the tread with a flat surface under load and pressure.

"Lateral" and "laterally" means lines or directions that are parallel to the axis of rotation of the tire (also "axial").

"Ply," means a continuous layer of rubber-coated parallel cords.

"Radial" and "radially" means directions extending radially toward or away from the axis of rotation of the track.

"Zero-degree wires" means at least one layer of parallel cords &usually metal wire), underlying the tread, unanchored to the bead, spiraling circumferentially around the tread, and having cord angles in the range from 0 degrees to 5 degrees with respect to the equatorial plane of the tire.

BRIEF DESCRIPTION OF THE DRAWINGS

The invention will be better understood by reference to the drawings when like numbers denote like parts throughout and wherein:

in FIG. 6 a second set of inner segments is extended radially outwardly, and in FIG. 7 the outer segments are retracted radially inwardly as the mold is shown in a fully closed position;

DETAILED DESCRIPTION OF THE INVENTION

Figure 1:
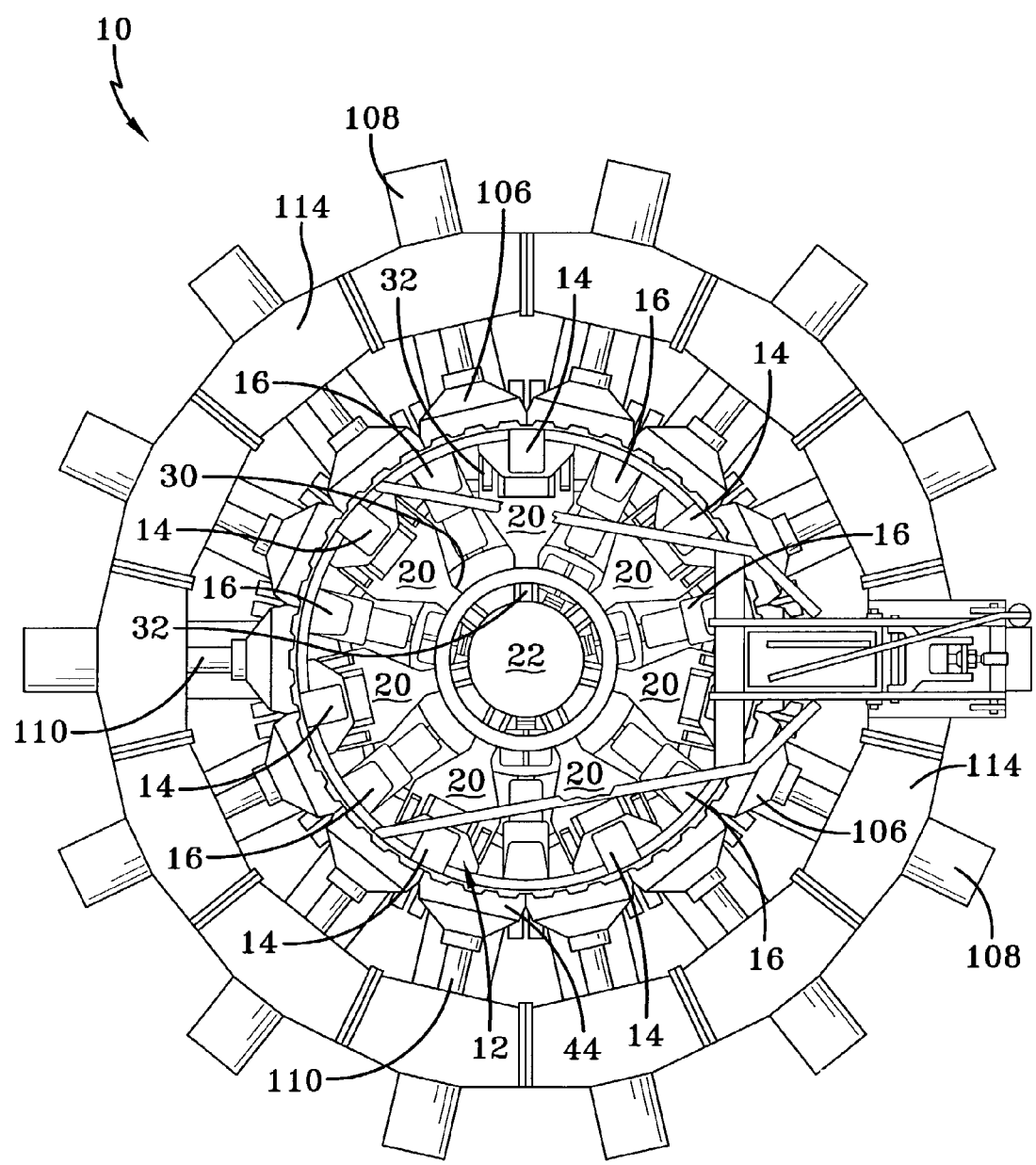
FIG. 1 illustrates a top view of a mold according to the prior art for curing a tire tread and tread belt assembly.
Figure 2:
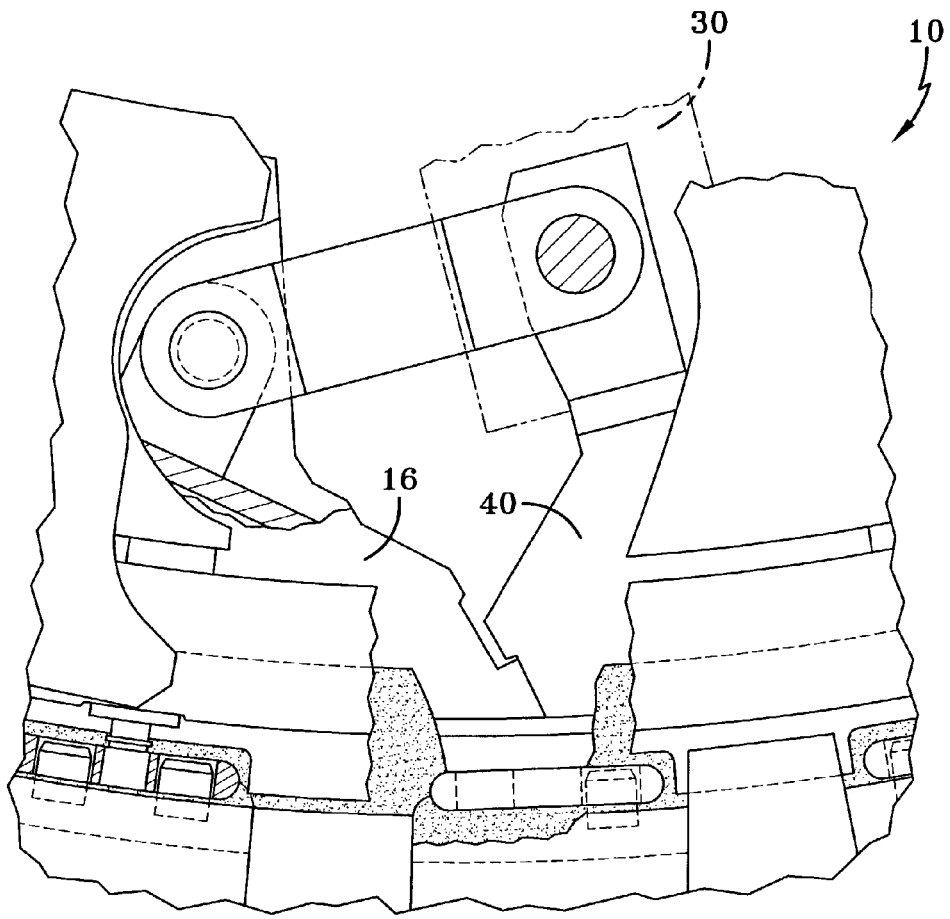
FIG. 2 is a partial view of the prior art mold showing the lower links.
Figure 3:
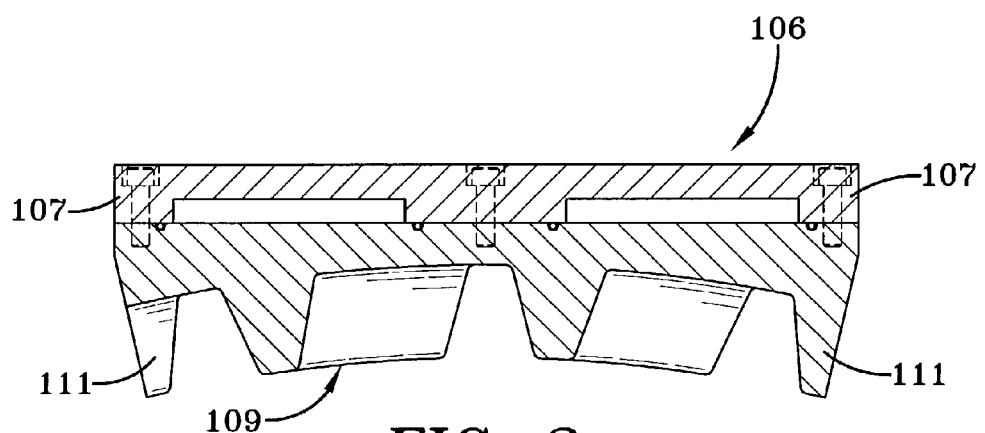
FIG. 3 is a cross-sectional view of the prior art mold outer segment of FIG. 1.

Prior art tire tread and track belt curing apparatus 10 shown generally in FIGS. 1, 2 and 3 details the structure of said prior art apparatus 10. The apparatus 10 included an inner cylinder 12 formed of a first set of a plurality of inner segments 14, a second set of a plurality of inner segments 16 which act as slave segments which are carried forward by the movement of the first set of inner segments 14, which segments 14 are powered. Thus, the first set of segments 14 and the second set of segments 16 fit together in alternating sequence to form the inner cylinder 12. It is necessary that the inner cylinder 12 be completely continuous. That is, gaps cannot be left between adjacent inner segments 14 and 16, and a proper mechanical arrangement must be provided to give an easy and smooth working mechanism whereby the first plurality of inner segments 14 and the second plurality of inner segments 16 can be easily retracted and advanced to form the continuous inner cylinder 12.

Retraction of the first set of segments 14 proceeds via action of a first plurality of links 20 under the impetus of an elevation cylinder 22 which is moved upwardly or downwardly under the impetus of a first hydraulic cylinder. The first hydraulic cylinder acts between a frame and the elevation cylinder to cause the elevation cylinder 22 to move upwardly or downwardly as guided by a centering slide which forms a part of the frame. As will be most apparent from FIG. 2, there is a second plurality of links 30 aligned below the first plurality of links 20 in one-to-one relation therewith so as to provide an even pulling or pushing force upon the tops and bottoms of the first set of inner segments 14 and upon the second set of inner segments 16. Each of the links 20 is pivoted at a plurality of first pivots 32 to the elevation cylinder 22. In the embodiment illustrated, the elevation cylinder 22 is at its lowermost position under the impetus of the hydraulic cylinder which is substantially fully retracted and in that position each of the first plurality of links 20 and the second plurality of links 30 is substantially horizontal thus holding the first powered set of segments 14 in their outwardly expanded position to form the continuous inner cylinder 12.

Referring now once again most particularly to FIGS. 1 and 2, there is illustrated therein some detail the structure and operation of the outer cylinder 44. Briefly, the outer cylinder 44 comprises a plurality of outer segments 106, each of which is retractable outwardly under the impetus of a respective one of a plurality of outer hydraulic cylinders 108, with each of the plurality of outer segments 106 being generally carried by a rod 110 of a respective one of the outer hydraulic cylinders 108, and with each of the segments of the plurality of outer segments 106 being slidingly held and positioned between a respective guide supported by the frame. For a more detailed description of the prior art structure reference to U.S. Pat. No. 4,207,052 should be made.

Each of the outer cylinders 108 is held by an outer ring portion 114 of the frame to form a continuous cylindrical ring as shown in FIG. 3. The outer segments 106 each contain a portion 109 of the tread pattern for the tread belt or track assembly. Each portion of the outer segments 106 has a pair of vertical ends 107 that are radially parallel to the axis of the prior art mold 10.

Accordingly, each outer segment 106 when viewed from the top has a circumferentially extending arcuately shaped top and bottom that are equal in length and aligned.

This prior art mold design required the segment parting lines at the ends 107 to cross over the groove forming ribs 111 of the tread forming outer segments 106 and the outer cylinder 44 and the inner cylinder 12 would sandwich the tread belt assembly in between the inner cylinder 12 and outer cylinder 44 causing a compression on the assembly. The segments were heated with steam passing through passages in the mold to cure the tread belt assembly.

Each inner segment 14, 16 and each outer segment 106 is held in abutting relation to the circumferentially adjacent segment. The outer segments 106 inwardly press radially against the tread and the inner segments 14, 16. During curing the retention of the segments in a fully closed position is critical.

Figure 5:
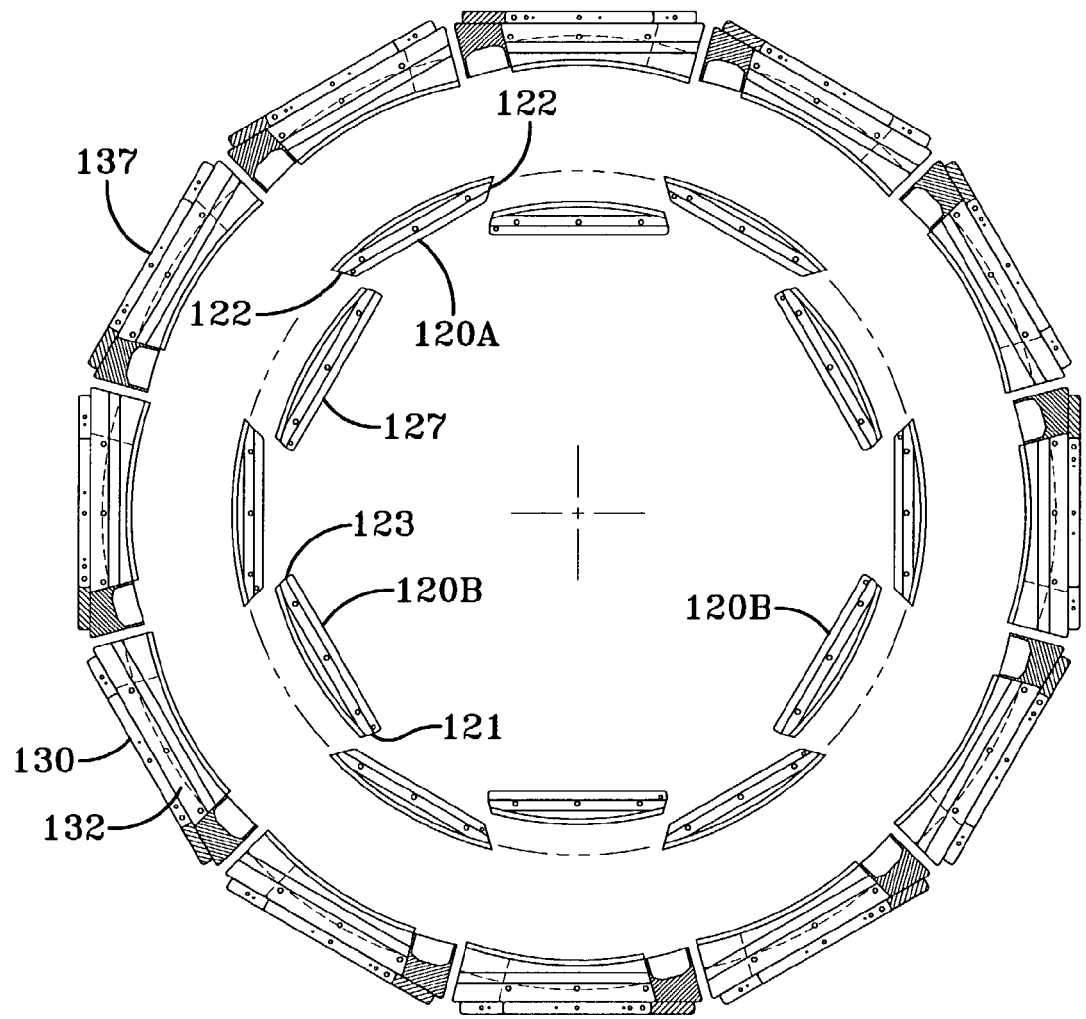
FIG. 5, FIG. 6 and FIG. 7 are top views of the inner and outer mold segments wherein in FIG. 5 a first set of inner segments is extended radially outwardly.
Figure 6:
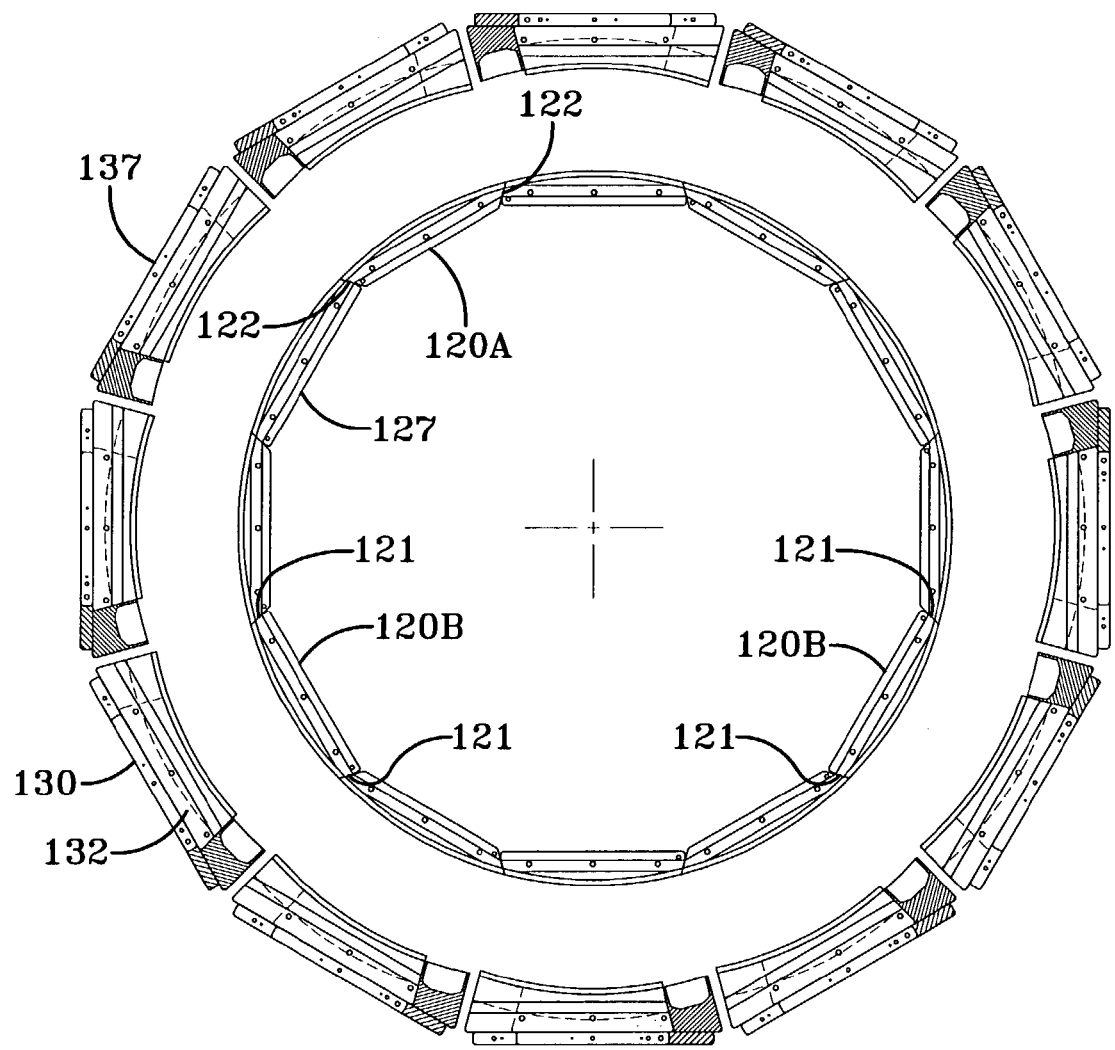

The present invention as illustrated in FIGS. 4 through 11 shows an improved mold curing apparatus for tread belt assemblies. As in the prior art design, inner segments of the present invention are employed that advance and retract in an alternating sequence. The first set of inner segments 120A are arcuately shaped with the abutting edges 122 flared outwardly as shown. The second set of segments 120B have the abutting edges 121 flared inwardly as illustrated, thus when the first set of inner segments 120A is extended to a closed molding position as shown in FIG. 5, the second set of inner segments can wedge the abutting edges 121 against the surfaces of the abutting edges 122 of the first inner segments 122 forming the inner ring as shown in FIG. 6.

Figure 7A:
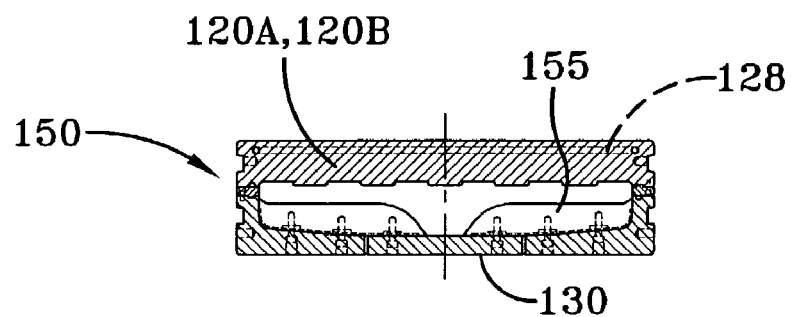
FIG. 7A is a cross-sectional view taken along lines 7A—7A of FIG. 7 showing an inner segment and outer segment in the mold closed position.
Figure 7:
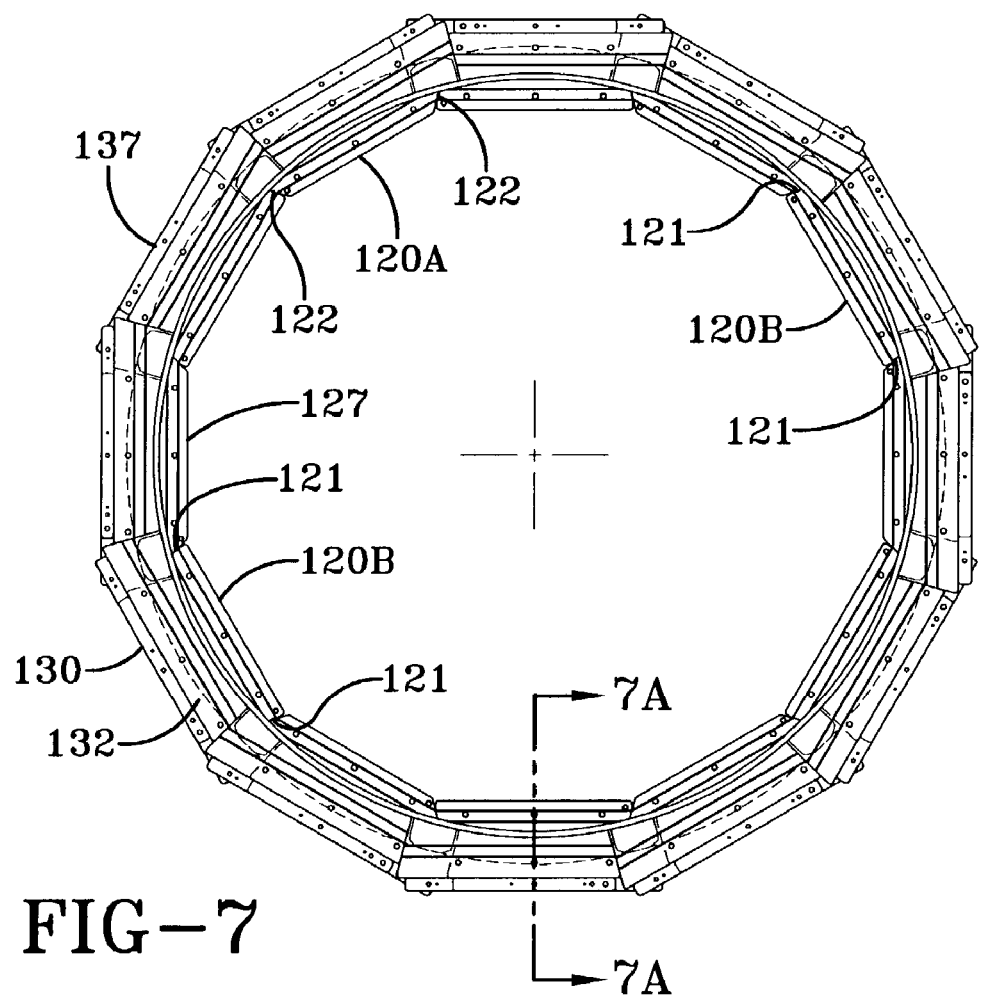

Once the tread belt assembly is securely positioned onto the expanded inner segments the mold can close wherein the outer segments can be moved radially inwardly as shown in FIG. 7.

Figure 4A:
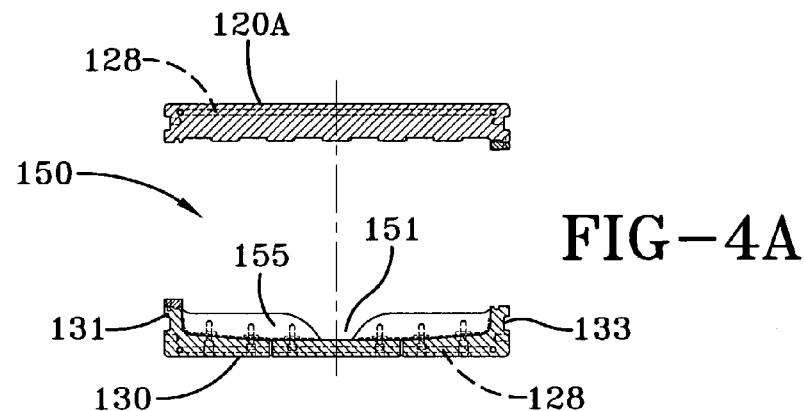
FIG. 4A is a cross-sectional view, taken along lines 4A of FIG. 4, showing the outer segment and the inner segment.
Figure 4:
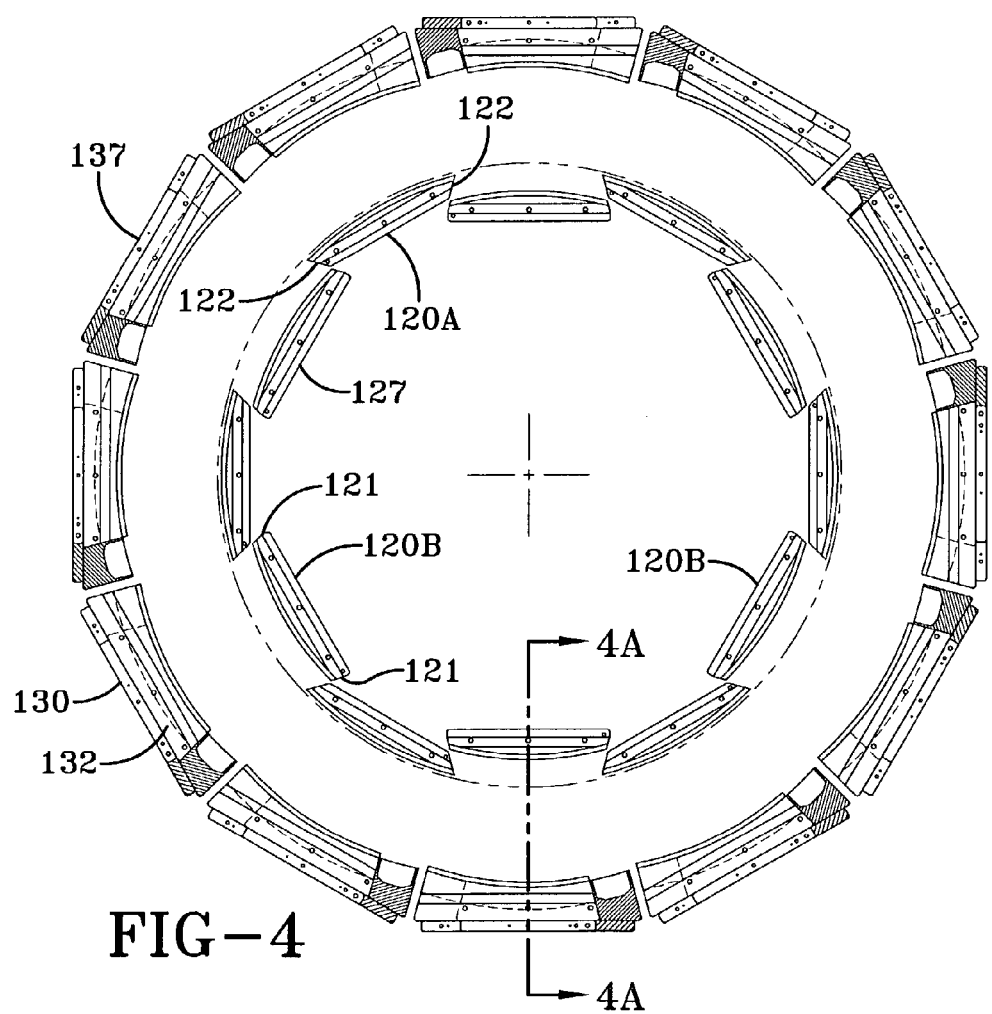
FIG. 4 is a top view of the mold segments according to the present invention illustrated in a full open position.

As shown in FIGS. 4A and 7A the movement of the radially outer segments 130 inwardly closes the space 150 between the cylinder formed by the inner segments 120A and the outer segments 120B.

The tread forming outer segments 130 press into the tread rubber forcing the tread rubber to move into the tread forming depressions 152. The groove forming ribs 155 on the mold surface 151 first engage the uncured rubber and push into the rubber. This movement requires a large amount of force but care must be exercised not to move the outer segments 130 too quickly into the tread belt so as to distort the underlying cord reinforcements or to close too slowly as to permit large amounts of rubber to get entrapped between the adjacent outer segments 130 in the area commonly referred to as the mold parting lines or to prematurely cure the rubber.

Figure 12:
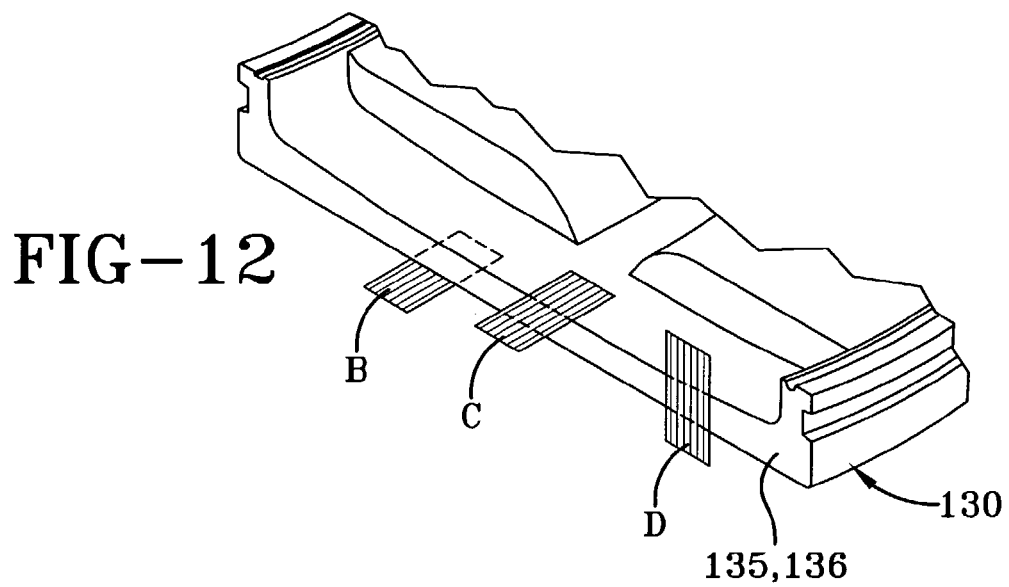
FIG. 12 is a perspective schematic view of the outer segments.

Preferably the uncured tread belt 2 can be contoured to facilitate displacement of the tread rubber into the mold 100. As shown for mold 100 in FIG. 3 the rubber was thicker in the center and then thinner at the lateral edges. As shown, the first tread belt, formed from a mold according to the present invention, had a circumference of 438.25 inches and a diameter of 139.5 inches. In cross section at the center tread belt assembly had a thickness of 6.2 inches that tapered to about 5.4 inches at the lateral edges. This is very complimentary to the tread forming outer segments contoured lateral edges and insures the tread rubber uniformly flows toward the lateral edges. The heated mold then cures at a pressure of about 400 psi for several hours. The tread belt as shown in FIG. 12 weighs over 4500 pounds.

As illustrated, the outer segments 130 number twelve. This number can be larger or smaller depending on the tread belt size. Each outer segment 130 extends circumferentially in an arc of 30°. Unlike the prior art, however, this 30° arcuate parallelogram is inclined at an angle θ relative to an axial direction. As illustrated the outer segments 130 are inclined such that θ is about 10°. Accordingly, the top of the outer segment 130 is shifted right 10° as the bottom is shifted toward the left 10° relative to the mold centerline. This effectively means that the outer segment 130 spans circumferentially about 50° from top to bottom. This inclination θ is preferably 5° or greater.

As the mold 100 closes each outer segment 130 can align with at least two inner segments 120A, 120B. Preferably each outer segment can align with one full inner segment 120A or 120B and portions of two other inner segments 120A or 120B when the mold 100 is fully closed. In this design the pressure exerted by the closing of the outer segments 130 is absorbed more efficiently, particularly the second set of wedge shaped inner segments 120A or 120B receive mechanical support in that at least one, preferably both, inner segments 120A of the first set or the second set are partially aligned with an inclined parallelogram shaped outer segment 130 in an alternating pattern. This means that the inner ring can resist the tendency to open more effectively than if the segments 130 were all vertically formed as in the prior art.

This shifting of the tread forming outer segments 130 to form an inclined parallelogram is ideally designed to enhance the structural integrity of the mold 100.

Figure 8:
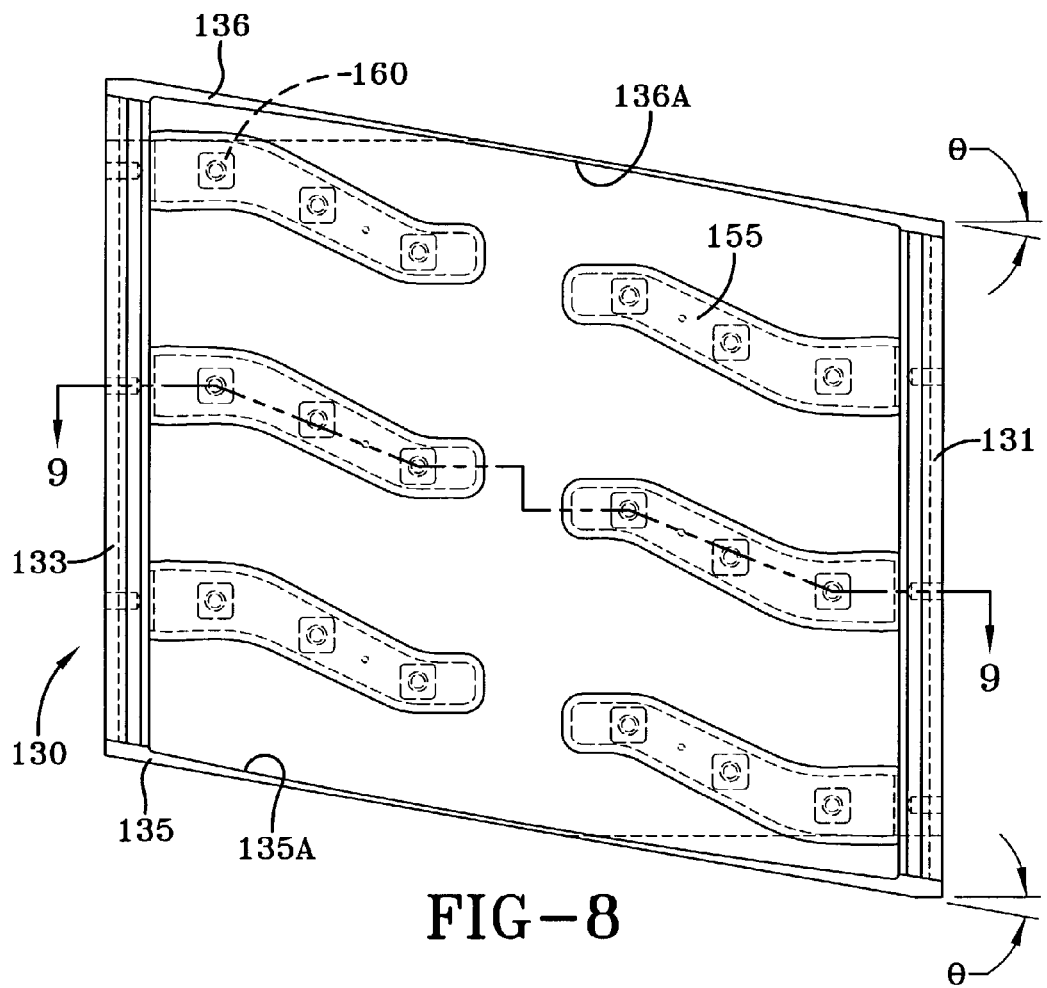
FIG. 8 is a plan view of the outer segment and the tread forming inner surface of the outer segment.
Figure 9:
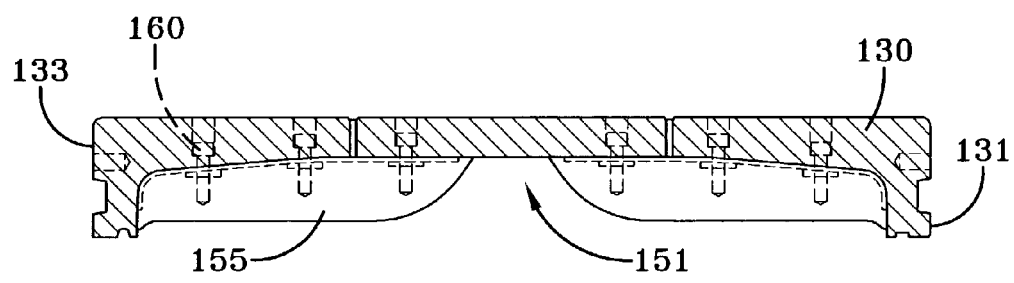
FIG. 9 is a cross-sectional view taken along lines 9—9 of FIG. 8.

As shown in FIG. 8 each groove forming rib 155 of the mold outer segments 130 are attached using threaded fasteners 160. As a result of the use of the inclined parallelogram design each rib 155 is fully positioned inside the parting lines formed by the ends 135, 136. In prior art designs having vertical sides at the parting line, shown in FIG. 3, portions of the ribs 111 may lie on or cross these parting lines. To make the tread these groove forming ribs 109, 111 would be cut leaving thin rib portions that would abut when the outer segments 106 closed. The present invention's use of inclined parallelograms insures the groove forming ribs 155 never cross the parting lines formed by the ends 135, 136. As shown six such groove forming ribs 155 are attached to each mold outer segment 130, three ribs 155 on each tread half.

With reference to the end surfaces and edges 135, 136 or 135A, 136A, or 135B, 136B of the outer segments 130 are inclined relative to the axis at an angle $\theta$ of 10° and are oriented radially inwardly. In other words in the embodiment shown having 12 equal sized arcuate parallelograms of an arc length of 30° each radially extending edge surface 135, 136 is inclined at 15° radially from a midpoint of the edges circumferentially as measured in any axial location across the mold face to intersect the mold axis. It is important to note that the calculations for compound angles on the parallelogram shaped outer segment 130 is actually more complex. The angle of the segment at the edge 135A, 136A of the end 135, 136 at or on the tread surface 150 is best defined by a tangent plane C on the tread surface in which the edge line 135A, 136A lies, the angle being defined by the formula Tan C=(Tan A) (Cos B), or in this case the angle A is the 10° inclination previously noted as $\theta$ and the Cos B is the 15° inclination as shown in FIG. 12. Thus, the Tan C=0.1703 and the angle C=$\tan^{-}$(0.1703), C being 9.666° at edge 135A, 136A at the inner surface 150. The angle D of the end surface 135, 136 can be defined as a line lying in a plane tangent to the end surface 135, 136, thus the Tan D=Tan B×Cos A or Tan 15°×Cos 10°, thus D=$\tan^{-}$(0.26388), D being 14.782°.

Figure 10:
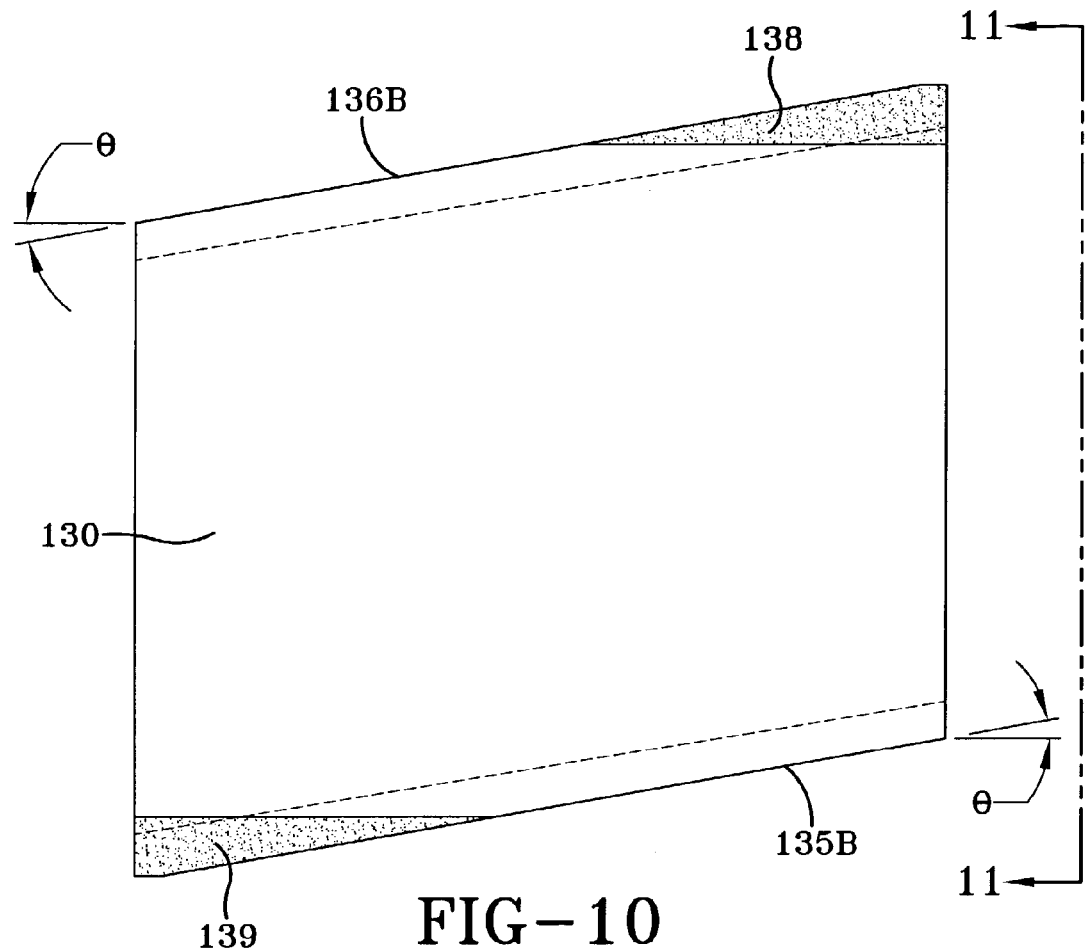
FIG. 10 is a plan view of the radially outer surface of the outer segment.
Figure 11:
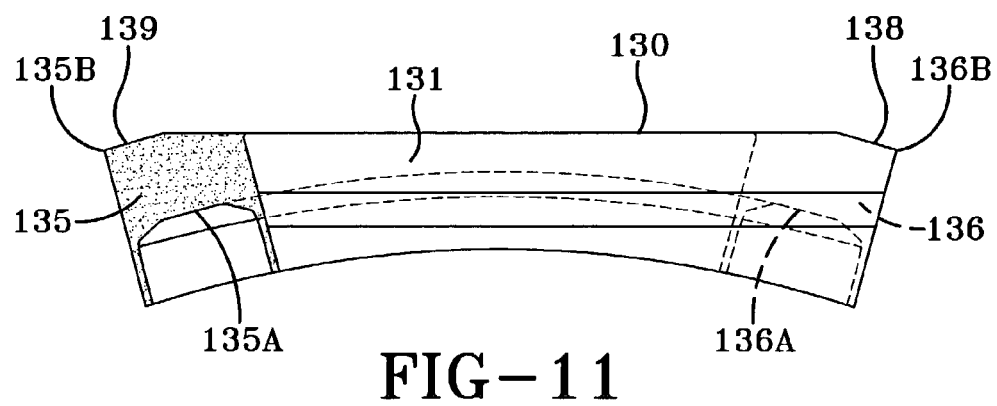
FIG. 11 is a top view of the outer segment.

As illustrated in FIG. 10 the outer segments at the opposite ends 135B, 136B on the end surface 135, 136 have chamfers 138, 139. These chamfers 138, 139 do not interfere with the edges 135A and 136A on the tread forming surface 150 which naturally must not have any gaps when closed. The closing of the parallelograms of these segments is greatly enhanced by using the chamfers 138, 139.

As further illustrated each mold outer segment 30 may include a top or bottom plate 131, 132 for forming the side of the tread belt as illustrated. Assuming a top plate 131 is used on each outer segment 130 then a corresponding bottom plate 132 could be affixed to the inner mold segment 120A, 120B as an alternative.

Both the inner segments 120A, 120B and the outer segments 130 have steam or fluid passages 128 for passing heated fluids to maintain the cure temperature of the mold 100 at a temperature below 400° F. typically. In addition, a thermal insulating block 127, 137 may be used adjacent the portion of the segments having the heat passages 128 to force the heat to move toward the molding surfaces 150 and away from the cylinder mechanisms.

Figure 13:
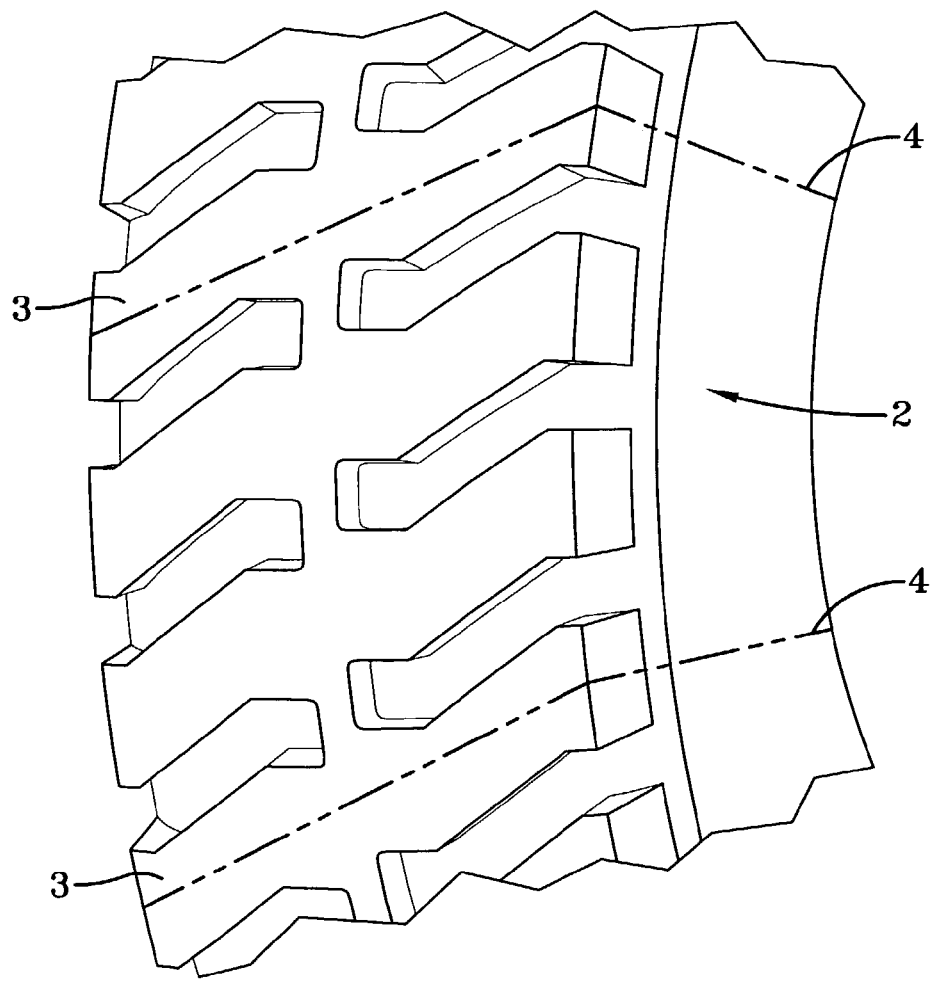
FIG. 13 is a partial view of the molded tread belt.

As shown in FIG. 13 a partial view of the molded tread 2 has the parting lines 4 shown diagonally extending across the tread and at the tread lugs 3.

What is claimed is:

1. A segmented annular tread mold for curing an annular ring tread, the mold comprising:
   a plurality of radially movable and outwardly expandable inner segments for forming the inner surface of the tread; and
   a plurality of radially movable and contracting outer segments for forming the tread outer surface, the radially outer segments being arcuately inclined parallelograms wherein each outer segment when in the closed molding position spans across at least two radially inner segments.

2. The segmented annular tread mold of claim 1 wherein each outer segment when in the closed position spans across one complete radially inner segment and portions of two other inner segments.

3. The segmented annular tread mold of claim 1 wherein the inclined parallelograms have inclined axial extending edge surfaces relative to the axial direction each edge surface being inclined at an angle $\theta$ of 5° or more.

4. The segmented annular tread mold of claim 1 wherein the outer segments have axial outer edges perpendicular to the axial direction.

5. The segmented annular tread mold of claim 1 wherein each of the inclined arcuately shaped parallelograms of the outer segment have a pair of obtuse included angles $\alpha$ and a pair of acute included angles $\beta$, the sum of $\alpha$ and $\beta$ equaling 180°.

6. An annular segment mold, the mold having an axis and a mid circumferential centerplane perpendicular to the axis, the mold comprising:
   a plurality of tread forming radially movable outer segments, each movable outer segment being an arcuate parallelogram having pairs of obtuse included angles $\alpha$ and acute included angles $\beta$ relative to the axis of the mold, the outer segments when closed form an annular ring of arcuately adjacent parallelograms.

7. The annular segment mold of claim 6 wherein each outer segment has two inclined axially extending edge surfaces inclined relative to the axial direction.

8. The annular segment mold of claim 6 wherein each outer segment has two arcuate axially outer ends perpendicular to the axis.

9. A segmented annular mold comprising:
   a plurality of movable outer segments for forming a tread outer surface, wherein each outer segment includes axially-inclined, parallel edge surfaces, each outer segment further comprising one or more groove forming ribs, wherein a parting line formed between adjoining outer segments does not cross said one or more groove forming ribs.

* * * * *